United States Patent [19]

Hinchcliffe

[11] 4,170,285

[45] Oct. 9, 1979

[54] APPARATUS FOR HANDLING ROD-LIKE ARTICLES

[75] Inventor: Dennis Hinchcliffe, London, England

[73] Assignee: Molins, Ltd., England

[21] Appl. No.: 712,804

[22] Filed: Aug. 9, 1976

[30] Foreign Application Priority Data

Aug. 14, 1975 [GB] United Kingdom ............... 33839/75

[51] Int. Cl.² .............................................. B65G 1/00
[52] U.S. Cl. ...................................... 198/347; 53/148
[58] Field of Search ............... 198/347, 407, 426, 433, 198/607, 471, 836; 53/148, 162; 214/6 TS, 6 BA

[56] References Cited

U.S. PATENT DOCUMENTS

| 2,014,458 | 9/1935 | Winkley | 214/6 TS |
|---|---|---|---|
| 3,171,550 | 3/1965 | Gajdostik et al. | 214/6 BA |
| 3,241,286 | 3/1966 | Dearsley | 53/148 X |
| 3,342,350 | 9/1967 | Seragnoli | 214/6 TS |
| 3,939,984 | 2/1976 | Butner et al. | 209/74 M |

FOREIGN PATENT DOCUMENTS

| 1144168 | 2/1963 | Fed. Rep. of Germany | 198/347 |
|---|---|---|---|
| 1268060 | 5/1968 | Fed. Rep. of Germany | 198/347 |
| 1708885 | 11/1970 | Fed. Rep. of Germany | 198/347 |
| 2254260 | 5/1974 | Fed. Rep. of Germany | 198/347 |
| 1404141 | 8/1975 | United Kingdom . | |

Primary Examiner—James B. Marbert
Assistant Examiner—Douglas D. Watts
Attorney, Agent, or Firm—Craig and Antonelli

[57] ABSTRACT

Batches of rod-like articles, such as cigarettes, conveyed transverse to the lengths of the articles are transferred, in another direction transverse to the lengths of the articles, to a second conveyor which has a path intersecting that of the first conveyor. The first conveyor may be a band conveyor and may include dividers for forming the batches. The second conveyor may be constituted by a pair of opposed bands having parallel rails for supporting batches. The second conveyor may form or lead to a store for batches. Both conveyors are preferably reversible under the action of a sensor so that batches may be supplied to or withdrawn from the store according to demand in an associated system, e.g. a conveyor system linking a cigarette maker to a cigarette packer.

4 Claims, 3 Drawing Figures

APPARATUS FOR HANDLING ROD-LIKE ARTICLES

This invention is concerned with apparatus for handling rod-like articles such as cigarettes.

The invention provides apparatus for handling rod-like articles comprising a first conveyor for conveying batches of parallel rod-like articles in a first direction transverse to the lengths of the articles, and a second conveyor for conveying batches of parallel rod-like articles in a second direction transverse to the lengths of the articles, the first and second conveyors having intersecting paths at a transfer position so that batches may be transferred directly from the first conveyor to the second conveyor or vice versa. Preferably the first and second directions are at right angles and where the batches are substantially rectangular in section they are preferably moved in a direction parallel to a side of the rectangle. The apparatus preferably includes means for confining the ends of a batch on the first conveyor: this may comprise means for separating a stream of articles on the conveyor. The second conveyor preferably includes separating means, which means may support the batches at the ends of the rod-like articles.

Preferably the first and/or second conveyor delivers each batch between the separating means of the second and/or first conveyor respectively. The separating means for each conveyor are thus arranged so that they do not interfere at the transfer position. The separating means of the first conveyor preferably includes spaced divider plates, which may be successively projected into a continuous stream on the first conveyor to form batches or successively removed from the batches to form a continuous stream, according to whether the direction of movement of the first conveyor is towards or away from the transfer position respectively. The first conveyor could extend on both sides of the transfer position. Preferably both first and second conveyors are reversible.

In a preferred arrangement the first conveyor comprises a band conveyor for supporting a stream consisting of a stack of rod-like articles, the conveyor being provided with movable separating means for dividing the stream into batches, as disclosed for example in British Patent Specification No. 1,404,141 or in U.S. Patent application Ser. No. 646,845 now Pat. No. 4,029,197 (German OS 2601738) or in U.S. Patent application Ser. No. 648,926 now Pat. No. 4,073,374. The second conveyor may take the form of cooperating members on each side of the first conveyor and adapted to engage successive batches and lift them from the first conveyor. For example, the cooperating members could be in the form of parallel endless bands arranged at right angles to and on each side of the first conveyor, each of these endless bands having inwardly-projecting ledges to engage the ends of the lowermost articles in a batch on the first conveyor. The bands may cooperate with stationary guide members to retain the outermost ends of the batches. With such an arrangement the first and second conveyors are preferably driven intermittently so that batches are removed (or supplied) by the second conveyor when the first conveyor is stationary.

The second conveyor may constitute or lead to a store or reservoir for rod-like articles. For example, where the first conveyor is connected to or associated with conveyor means linking one or more cigarette making machines to one or more cigarette packing machines, the second conveyor may be a reservoir or buffer for accommodating cigarettes when the production of the makers exceeds the demand of the packers or for supplying cigarettes to the first conveyor (and thence to the packers) when the production falls short of the demand The apparatus may be automatically reversible in response to sensors, which monitor the supply/demand situation, and may operate in an analogous way to the storage unit disclosed in British Patent Specification Nos. 1,404,141 and 1,404,142.

The invention will be further described by way of example with reference to the accompanying drawings in which.

Figure 1:
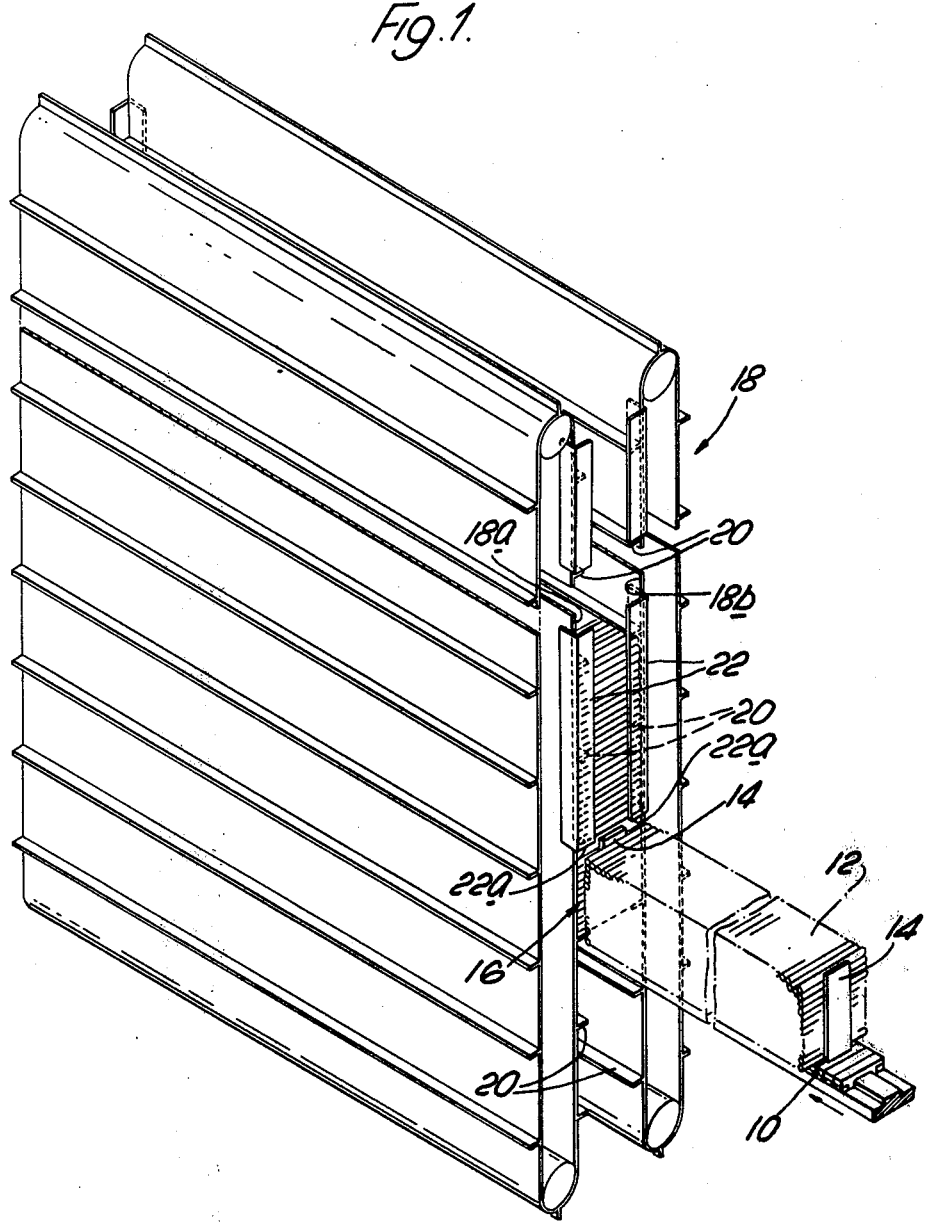
FIG. 1, is a diagrammatic perspective view of part of an apparatus for handling cigarettes including first and second conveyors for batches of cigarettes.

FIG. 1 shows part of an endless band first conveyor 10 which has a substantially horizontal upper run supporting a stream 12 consisting of a stack of parallel cigarettes. The stream 12 is divided into batches on the conveyor 10 by regularly-spaced divider plates 14 carried by the conveyor. The divider plates are movable relative to the surface of the conveyor 10 and may be successively projected into a continuous stream to form batches or withdrawn to reform a continuous stream, at a position generally to the right of the part of the apparatus shown in FIG. 1, in any convenient way, for example as disclosed in British Patent Specification No. 1,404,141 or U.S. Patent application Ser. No. 646,845 (German OS 2601738). Alternatively batches may be formed by feeding a stream of cigarettes downwards onto a conveyor having fixed divider plates, as disclosed for example in U.S. Patent application Ser. No. 648,926.

In one mode of operation of the apparatus the conveyor 10 moves batches of cigarettes towards a transfer position 16. The movement of the conveyor 10 is intermittent and in each stage the conveyor is moved through a distance equal to the spacing between successive divider plates so that batches may be successively conveyed to the transfer position 16 and the conveyor then stopped. The transfer position 16 is defined by the intersection of the upper run of the first conveyor 10 with a second conveyor 18 which comprises substantially vertical parallel endless bands 18a, 18b disposed on opposite sides of the conveyor 10, and spaced by a distance slightly greater than the length of the cigarettes on the conveyor 10. The width of the bands 18a, 18b is approximately equal to the length of a batch on the conveyor 10 (but could be sufficiently wide to accommodate several batches). As can be seen from FIG. 2 the width of the first conveyor 10 is somewhat less than the lengths of the cigarettes. Each of the bands 18a, 18b carries spaced inwardly-directed rails or ledges 20 which are sufficiently wide to be able to support the cigarettes at their ends but not wide enough to interfere with the conveyor 10. The spacing between the ledges 20 on the bands 18a, 18b is slightly greater than the height of a batch on the conveyor 10.

Figure 2:
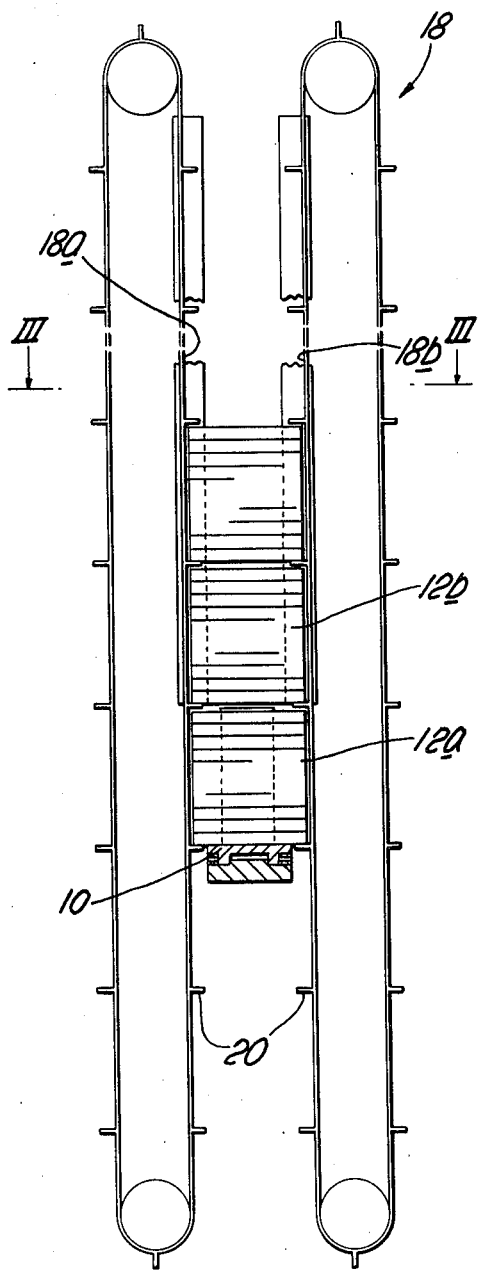
FIG. 2, is a vertical sectional view through the apparatus of FIG. 1 at right angles to the first and second conveyors, and on the line II—II in FIG. 3.

In said one mode of operation of the apparatus the conveyor 18 comprising bands 18a, 18b is movable intermittently in stages through a distance equal to the spacing between successive ledges 20. Thus batches are successively supplied by conveyor 10 to the transfer position 16 so that the batches rest on the conveyor 10 between ledges on the bands 18a, 18b. Whilst the conveyor 10 is moving the conveyor 18 is stationary: as soon as the conveyor 10 stops, having delivered a batch to the transfer position, the conveyor 18 starts and operates to move the batch upwards, from the position 12a to 12b as shown in FIG. 2. In this manner batches supplied to the transfer position 16 are successively removed by the second conveyor 18.

Figure 3:
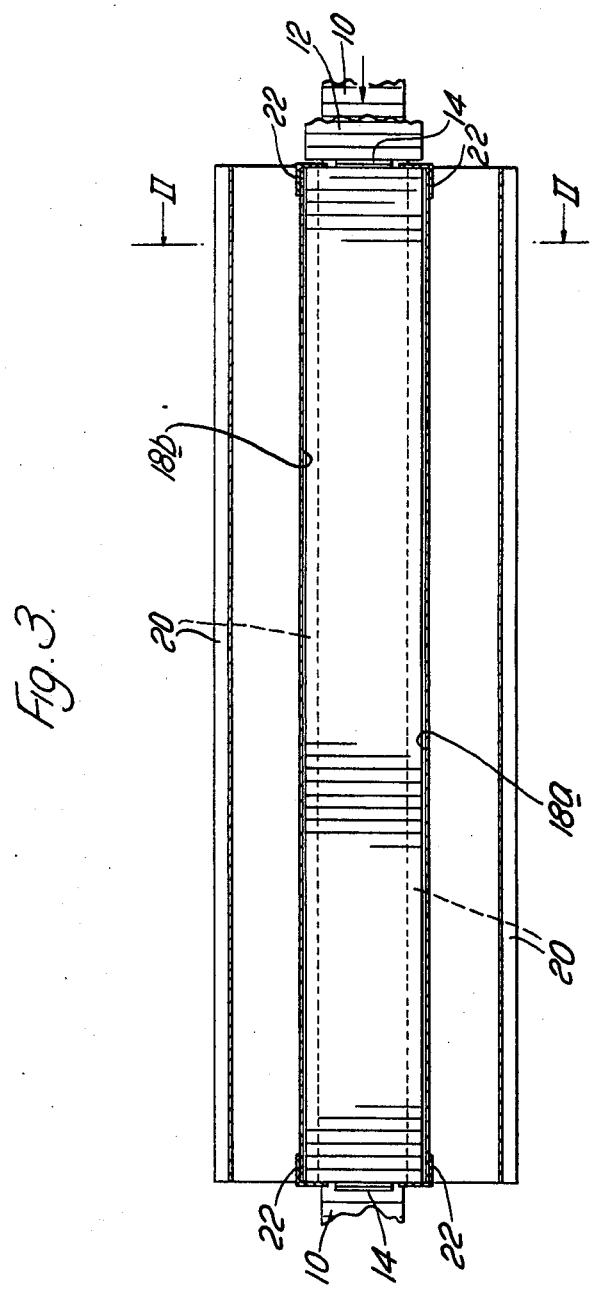
FIG. 3, is a horizontal sectional view on the line III—III of FIG. 2.

The endless bands 18a and 18b of the second conveyor cooperate with four stationary corner guides 22 which serve to support the ends of the batches on the second conveyor as shown in FIG. 3. The portions of the guides 22 which project inwardly are narrower than the divider plates 14 so that cigarettes are not damaged by the edges 22a (FIG. 1) as the conveyor 18 lifts the batches.

Both the first conveyor 10 and the second conveyor 18 are reversible so that batches may be returned to the first conveyor and subsequently moved away to the right (as viewed in FIG. 1). Alternatively the conveyor 10 could extend to the left of the transfer position and convey returned batches in the original direction. During return of a batch to the conveyor 10 by downward movement of the conveyor 18 the divider plates 14, which have tapered upper ends adapted to be projected into a continuous stream, take over from the guides 22 to confine the batch on the conveyor 10.

The primary use envisaged for the present apparatus is as a store or reservoir for batches of cigarettes (or filter plug lengths). In systems where cigarettes or the like are moved in a stream such as the stream 12 between one or more makers and one or more packers the conveyor 10 can be linked to the main stream to provide access to a buffer store formed by conveyor 18. Sensors capable of operating such a system automatically are described in British Patent Specification No. 1,299,174.

The space between the bands 18a, 18b above the conveyor 10 may constitute the whole extent of the reservoir. Such a reservoir could accommodate 20,000 cigarettes in batches of 1200 in a height of about six feet. With such an arrangement control means would prevent the conveyor 18 from accepting any more batches when it had reached the limit of its capacity. Alternatively, the second conveyor could supply a further reservoir for batches of cigarettes, which could be an infinite reservoir. The second conveyor could be used for moving batches from the conveyor 10 to a similar conveyor at a different level.

Instead of comprising a pair of endless bands 18 the second conveyor could take the form of a rectangular tray open at opposite ends and provided with appropriately spaced internal ledges. Such a tray could provide a useful limited capacity reservoir. If the conveyor 10 is arranged to be open ended and internally supported at that end a tray of this type could be moved on and off the conveyor and so form part of an infinite capacity reservoir. Similarly, it would be possible to provide supporting structure for conveyor bands 18 so forming a unit which could be moved away parallel to the conveyor 10 when full and replaced by an empty unit (or vice versa). Mobile reservoirs thus formed could conveniently be provided with wheels for moving them into position and could be used in substantially the same way as the mobile reservoirs disclosed in British Patent Application No. 15750/76, to which reference is directed in its entirety.

In said application mobile reservoirs are described which are adapted for connection to a conveyor (usually an elevator unit) forming part of a conveyor system linking one or more cigarette making machines to one or more cigarette packing machines. The mobile reservoirs are used to adjust the net flow between the makers and packers and thus may supply cigarettes to or accept cigarettes from the system. The drive for the reservoirs may be derived from a drive output associated with the system conveyor so that each reservoir is automatically connected to the drive output as it is moved into engagement with the conveyor. The conveyor 10 of the present application could comprise an extension of an elevator unit leading to the conveyor system and mobile reservoirs could be moved on and off the conveyor in a direction parallel to the conveyor as previously described.

I claim:

1. Apparatus for handling rod-like articles comprising an endless first conveyor; spaced divider means movable with said first conveyor and arranged to separate into batches a stream of rod-like articles on said conveyor, each batch comprising a stack of parallel articles arranged with their axes transverse to their direction of movement on said conveyor, the ends of each batch being confined by said divider means; second conveyor means comprising a pair of opposed cooperating endless band conveyors arranged on opposite sides of said first conveyor, each of said cooperating endless band conveyors having spaced inwardly-directed support means for engaging the ends of articles in a batch on said first conveyor and for removing successive batches directly transversely from said first conveyor, said batches being supported between said cooperating endless band conveyors in spaced relationship by said support means; and stationary guide means disposed along respective lateral ends of each of said cooperating endless band conveyors for retaining the ends of said batches on said second conveyor means, each of said stationary guide means including an inwardly-directed projecting portion with the inwardly-directed projecting portion at the respective ends of the endless band conveyors and having a width which is narrower than the width of said divider means.

2. Apparatus as claimed in claim 1 wherein said guide means comprises a pair of strips arranged alongside the support means of each of said cooperating endless band conveyors of the second conveyor means.

3. Apparatus as claimed in claim 1 wherein the opposed cooperating endless bands are provided with internally-directed spaced rails for supporting the batches.

4. Apparatus as claimed in claim 1, wherein said guide means comprises corner guides arranged adjacent the sides of said cooperating endless bands of the second conveyor means.

* * * * *